Figure 1:
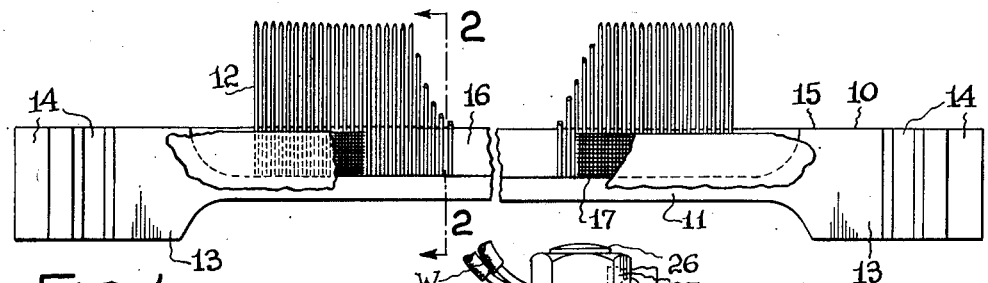

Aug. 5, 1952          A. J. CRAIG          2,606,269

FALLER BAR AND METHOD OF MAKING SAME

Filed June 12, 1948          2 SHEETS—SHEET 1

INVENTOR.

ALFRED J. CRAIG

BY *Bosworth & Sessions*

ATTORNEYS.

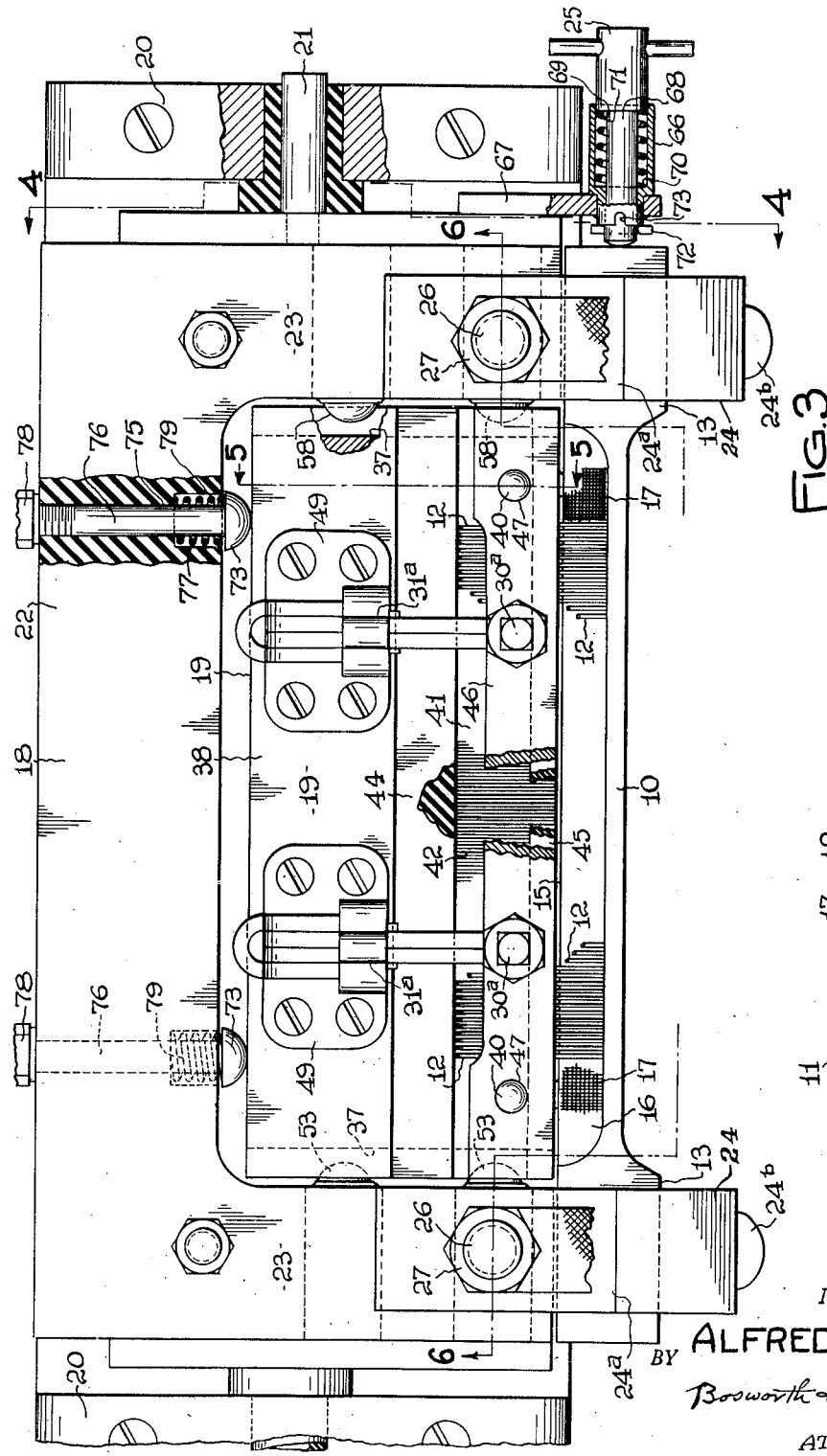

Patented Aug. 5, 1952

2,606,269

UNITED STATES PATENT OFFICE 2,606,269

FALLER BAR AND METHOD OF MAKING SAME

Alfred J. Craig, Euclid, Ohio; Jessie M. Craig, executrix of said Alfred J. Craig, deceased, assignor to herself Application June 12, 1948, Serial No. 32,569

11 Claims. (Cl. 219—12)

This invention relates to the type of textile combs known as faller bars and more particularly to an improved method and means for soldering needles to a faller bar.

The process of securing needles to a faller bar, called "pinning," has in the past often been done by soldering the needles to the bar with a hand soldering iron. This is a tedious, slow, and relatively expensive operation. The worker cannot heat the solder uniformly and cannot therefore effectively insure good contact between the solder and the pins and the faller bar. Soldering irons which can be easily handled by the worker have not the required heat capacity and cannot transmit enough heat to the work; with such irons it is necessary to change and reheat the soldering irons frequently. On the other hand soldering irons with a sufficient heat capacity to do the job are so heavy that the worker tires easily and finds them awkward and difficult to handle. This holds true for both gas heated and electric soldering irons. In any case production of faller bars by this method is slow and unreliable.

My invention avoids these disadvantages and difficulties by providing improved and novel means for holding the parts in assembled relation and by using the same means to pass an electric current through the bar whereby the resistance of the bar to the passage of the current creates the heat for the soldering operations. This method enables uniform and efficient heating of the bar and proper melting of the solder. The solder melts substantially simultaneously over all the soldering area; there are no cold spots or hot spots. The success of the soldering operation is no longer dependent upon the skill of the worker but is practically automatic in operation and results. All that the worker need do is to provide clean bonding surfaces and the automatic control of the electric current does the rest. The heating of the bar by its own resistance is accomplished very rapidly, the current flows for only a few seconds and this time is so short that there is no drawing back or softening of the hardened parts. A good soldering bond is secured at every point of the faller bar and every bar is of high and uniform quality. Accuracy of manufacture is readily controlled and uniformity of product is ensured. As a matter of test under actual service conditions, faller bars produced by my invention have been shown to possess a bond of superior strength and consequently an appreciably longer service life. Economies both in manufacture and in use are thus provided.

One limit to the useful life of a faller bar is the fatigue strength of the solder bar in service. The bar is subject to rapid and severe shocks as the cams kick the bars out of and into contact with the upper feeding and lower reversing screws. The solder bond is the first to fail under such conditions, failure resulting when one or more needles work loose. Stemming directly from the ability to solder all the needles simultaneously to the bar according to my invention is an improved bar construction comprising essentially the improvement of imbedding a strong wire screen or gauze within the solder adjacent the needles. This strip of gauze which preferably extends the full length of the solder bond takes the shocks of service, reinforces the bond directly, and otherwise improves the life of a faller bar considerably over similar bars.

A general object of my invention therefore is to provide an improved method of soldering pins to a faller bar having the advantages of increased production and better and more uniform performance and reliability of product. Another object is to provide a semi-automatic method of soldering in contrast to the manual methods of the past and present. A more specific object is to produce the heat for the soldering operation by passing an electric current through the bar itself and utilizing its resistance to the flow of current to produce the heat. A further object is to provide improved means by which the needles are held accurately in place and in relation to the faller bar during the soldering operation. Another object is to produce a faller bar of improved and stronger construction and having a reinforcing element which imparts a much increased operating life.

Figure 4:
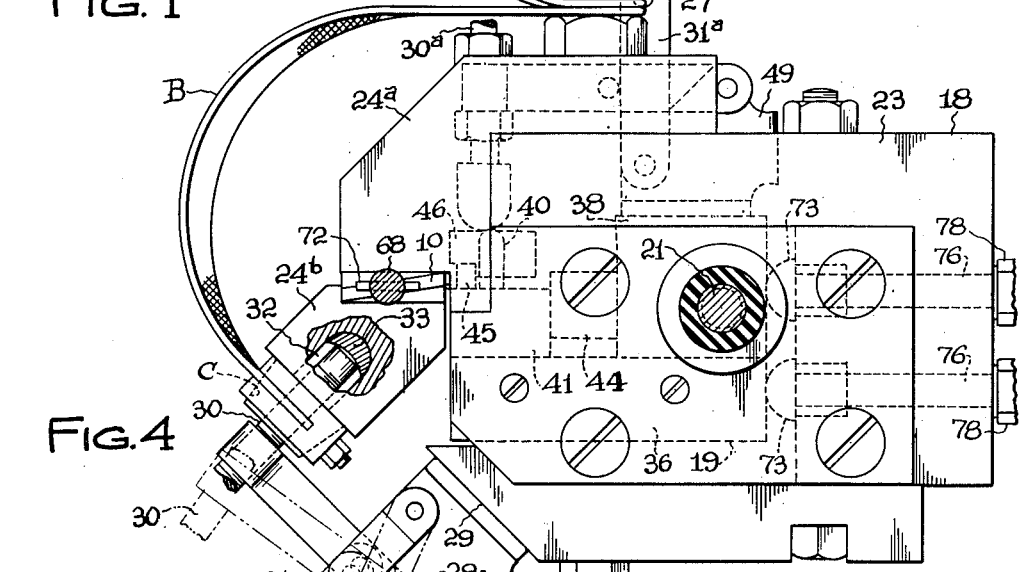
Figures 5, 6:
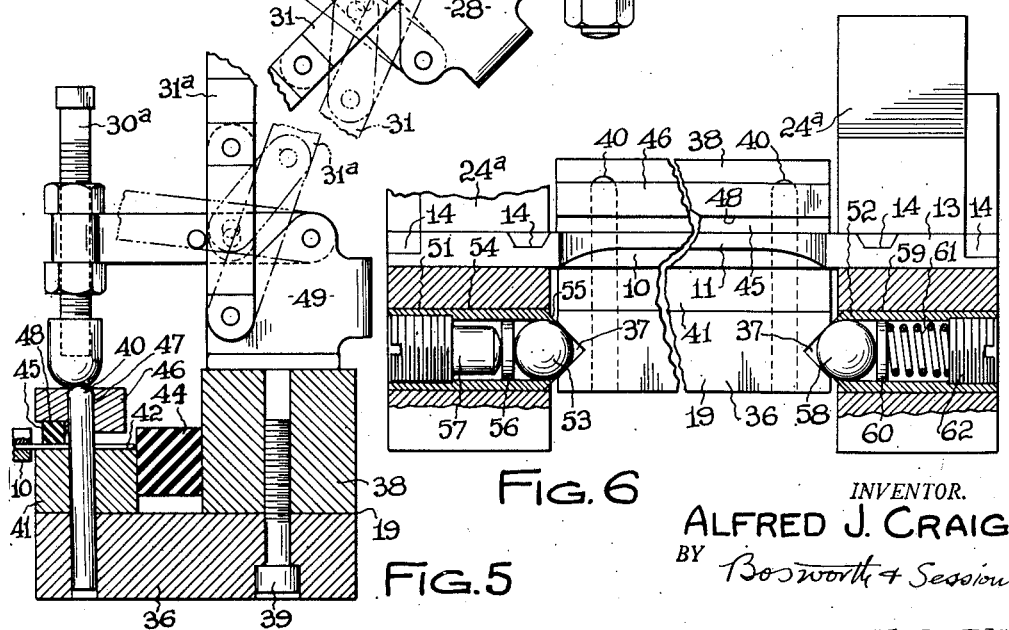

Other objects and advantages will more fully appear from the following description of my invention, reference being had to the accompanying drawings in which: Figure 1 is a plan view of the faller bar having a construction according to my invention and adapted to be manufactured by the method and means of my invention; Figure 2 is a transverse sectional view of the faller bar on an enlarged scale taken in the plane 2—2 of Figure 1; Figure 3 is a plan view showing the essential parts of an assembly fixture together with the parts of a faller bar in position for the soldering operation; Figure 4 is a transverse sectional view taken in the plane 4—4 of Figure 3; Figure 5 is a transverse sectional view taken along the plane 5—5 of Figure 3; Figure 6 is a fragmentary longitudinal sectional view taken in the plane 6—6 of Figure 3.

My invention is illustrated with reference to the manufacture of a faller bar 10 such as that shown in Figures 1 and 2 having an improved design with regard to strength and service life though otherwise of more or less conventional design. The bar is machined from steel and has a shank portion 11 to which needles or pins 12 are soldered and has flat enlarged end portions 13 of appreciably greater area. The end portions are provided with the usual grooves 14 which are adapted to engage the gill box mechanism. The end portions including the grooves are hardened to resist wear but the shank portion is not hardened. Extending longitudinally along the straight edge 15 of the bar for substantially the full length of the shank portion is a groove or recess 16 which is adapted to receive the butt ends of the needles 12 and to hold the solder which secures the needles to the bar. Overlying the needles and imbedded in the solder is a stiff and relatively strong strip of wire gauze 17 which strengthens the mass of solder appreciably.

In soldering the needles to the bar the bar 10 is held within a fixture 18 in proper relationship to the needles 12 which are held in a jig 19 positioned within the fixture and an electric current is passed through the bar to heat the bar while solder is supplied to the assembled parts. The current is of such characteristics that the bar heats rapidly and uniformly and melts the solder effectively. The needles are thus securely and accurately bonded to the bar. This result is obtained by proper adjustment of voltage, amperage and time of current flow and by proper design of the jig and fixture which enables thermal expansion of the parts without deleterious effects on the accuracy of assembly and which effectively confines the current and the heat to the bar so that the hardened portions of the bar and the hardened needles will not be softened and so that the jig and fixture will not shunt the current from the bar. These features enable a rapid and reliable method of soldering.

In practicing my method of "pinning" I find it advantageous from the standpoint of production to have the fixture 18 secured to a bench and to use the fixture not only to hold the parts but as well to provide the means to pass current through the bar. On the other hand I find it preferable to have a number of standard interchangeable jigs 19 which can be inserted into each fixture so that while one jig is being used for soldering, the others can be loaded with needles or can be set aside for cooling after the soldering operation.

The needles, the bar, and the jig and fixture are assembled as shown in Figure 3. The fixture 18 takes the form of a U-shaped frame member supported on standards 20 by trunnion mountings indicated generally at 21. The manner of supporting the frame is not important but I prefer to mount the frame on trunnions so that if desired the frame can be rotated to the most convenient operating position. The frame comprises a main portion 22 and a pair of arms 23 extending outward from the main portion and at right angles thereto. A pair of clamping jaws 24 are secured at the ends of the arms, to hold the faller bar in place, the bar taking a longitudinal position within the jaws as determined by a stop 25 secured to one of the arms 23 of the frame 18. Electrical leads, designated at W, connect the jaws 24 to an appropriate source of power, not shown. Positioned within the frame 18 between the arms is the jig 19 which holds the needles 12 so that the butt ends of the needles extend into the recess 16 of the bar as shown. When the parts are in this position, the current is turned on by switch means, not shown, and an electric current is passed through the bar, the jaws 24 acting as electrodes to introduce the current into the bar. Resistance of the bar to the passage of current causes the bar to heat rapidly and uniformly. When solder is applied to the bar, the heat causes it to melt quickly and completely.

The fixture or frame 18 is preferably of material which is strong and durable and which possesses fairly high dielectric properties so that the frame itself does not short the jaws 24. I have found it practicable to machine the frame from a plastic impregnated laminated wood product of a type which is well-known. This material is easily machined to accurate dimensions and is rigid and strong.

The jaws 24 which are preferably of copper, each comprise, as best shown in Figure 4, an upper jaw member 24a fixedly secured to the frame by bolts 26 and a movable lower jaw member 24b which is universally mounted on a clamp 28 secured to the frame as at 29. The lower jaws 24b are adapted to be moved upward by the clamp and locked in clamping position to grip and hold the ends 13 of the bar against the upper jaw members. The clamp 28 may be any one of several standard toggle clamps sold for the purpose, and its details of construction form no part of my invention. Suffice it to say that each clamp 28 comprises a stem member 30 which supports a lower jaw 24b and a handle 31 for operating the clamp. When the handle is manually operated it will move the stem from the dotted line position of Figure 4 to the solid line position in which the stem 30 forces the jaw member 24b into clamping position. The jaw member 24b is provided with a socket 32 which fits loosely over the stem of clamp 28 and which has a spherical seat 33 at the bottom of the socket with which the rounded end of the stem cooperates to give the jaw limited universal movement. The seat 33 preferably is a hardened steel insert.

The jaws are recessed, as shown in Figure 4, in order to more easily grip the end of the bar and are of such size that virtually the entire flat area of the bar ends 13 are clamped. This area of contact is substantially greater than the cross-sectional area of the bar, but the apparently excess gripping area has been found to be desirable. Thus if the imperfect contact should occur for any reason between the jaws and the bar there will still be enough area to transmit the current. More especially it has been found to be necessary to hold the bar in the jaws with a grip which permits the bar to slide in the jaws when the bar increases in length as a result of thermal expansion during the soldering operation. As a result of this sliding grip I prefer to grip the bar with jaws of considerable area.

The bolts 26 which secure the upper fixed jaw members 24a to the frame also provide convenient means for securing the electrical leads W to the jaws. As shown in Figure 4 the leads W are secured to the bolt 26 by nut 27 making electrical connection respectively with each of the fixed jaw members through the bolts 26. Preferably each pair of jaw members 24a and 24b are electrically connected by a battery cable B or similar conductor which is connected to jaw member 24a by the bolt 26 and nut 27 and to the corresponding jaw member 24b by a clamp C which is adapted to grip the lower jaw member.

The jig 19 is adapted to hold the needles in a manner which permits accurate assembly and which as well facilitates the soldering operation. It comprises a number of elements which can be easily assembled including a base member 36 which has V-grooves 37 at each end extending the full width of the base member. Mounted at the rear of the base member is a backing block 38 which is secured to the base member by machine screws or by any other convenient means. Extending upwardly from the base adjacent each end of the base are the pins 40 which support and removably secure a block 41 to the base. The block 41 has a plurality of laterally extending grooves 42 corresponding in number and in spacing to the number of needles 12 in the faller bar. When the jig is loaded the needles are placed within the grooves 42 with their pointed ends extending inwardly and abutting a block 44 which is wedged securely between the backing block 38 and the block 41. The block 44 positions the needles so that their butt ends extend outwardly from the jig. The grooves 42 have a depth somewhat less than the thickness of the needles so that the needles project slightly above the top surface of the block 41. The needles are clamped in place within the grooves 42 by a resilient strip 45 which is forced to bear upon the needles by a clamping member 46. The member 46 has a pair of drilled holes 47 which enable the member to slide freely upon the pins 40 and is provided with a groove 48 to receive the resilient strip 45. The strip is slightly thicker than the depth of the groove 48 so that it will be compressed between the member 46 and block 41 to grip the needles with some force and to accommodate for variations in needle size. The member 46 is held in clamping position by a pair of clamps 49 which are supported on the block 38. The clamps are similar to those previously described as supporting the jaw members 24b, each having a stem 30a and an operating handle 31a. When the clamp handles are pulled forwardly and downwardly the stems 30a will bear upon the block 46 and in that position will maintain clamping pressure upon the block 46 and thus upon the strip 45 and the needles.

With the exception of member 44 the jig parts are preferably made of aluminum so that the jig may be easily handled. Aluminum is particularly an advantageous material for the needle block 39 because it will not solder and therefore if solder should be drawn into the grooves the needles will not stick within the grooves. If the member 41 is anodized the oxide coating will provide sufficient resistance to prevent shorting through this member. The strip 45 should be of dielectric material to prevent shorting across the needles and should also be resilient and resistant to heat. Silicone has been found satisfactory for such use. The silicone keeps the clamping member 46 spaced from the needles so that there is no necessity that this member be of dielectric material. The member 44 should be hard enough to resist abutment with the sharp pointed ends of the needles without deleterious wear and yet not so hard that the needles will be blunted. It is also important that the block 44 be of dielectric material so that the current passing through the bar will not be diverted to flow through the pointed ends of the needles for in such case the cross section of the needles is so small that the needle points will burn up. The material known as "micalex" has been found suitable for the purpose. Micalex is a ceramic appearing material made from crushed mica, having good dielectric properties, and wear resistance and capable of being machined readily. The block member 44 is square in section so that the sides of the square can be turned to present new abutting surfaces to the needles. It can also be turned end for end to make available the surfaces otherwise gripped between the blocks 38 and 41.

Since the bar is held separately by the fixture and the needles are held separately by the jig it is necessary that the jig and fixtures be capable of accurate assembly together in order to position the bar and needles relative to each other within the limits of accuracy required by the faller bar tolerances. To this end the arms 23 of the fixture are provided with ball roller means adapted to coact with the grooves 37 of the jig and to provide for accurate positioning of the jig longitudinally in the fixture. The roller means in the left arm of the fixture comprise a pair of spaced ball units 51 in which the balls are adapted to roll freely but which have little or no lateral play, while the roller means in the right arm comprise similar ball units 52 which differ in that the balls are spring mounted for longitudinal motion, see Figure 6. The roller units 51 each comprise a ball 53 mounted for rolling movement within a tube 54 which extends through the arm 23 and whose inner edge is peened over as at 55 to hold the ball within the tube. The ball is backed up by a washer 56 which takes its position according to a threaded plug 57 which engages internal threads within the tube and which is accessible from outside the fixture arm for adjustment as desired. The roller units 52 are of similar construction, having balls 58 mounted in tubes 59 and backed up by washers 60. However each of the washers 60 is backed up not by a solid unyielding plug but by a coil spring 61 and by a short threaded plug 62 as shown.

The jig can be easily inserted into the fixture with the grooves 37 of the jig engaging and rolling upon the balls of the roller units. The longitudinal position of the jig within the fixture will be determined by the position of the balls 53 which will act as a stop for the jig which is forced against the balls 53 by the springs 61 of the opposing ball means. All that remains is to position the faller bar relative to the jig which is thus positioned within the frame. This is done by means of the stop 25 which positions the faller bar longitudinally within the jaws as previously mentioned. The relative position of the jig and the needles held by the jig in respect to the faller bar is thus determined by the balls 53 and the stop 25. Accuracy of longitudinal position is thus easily maintained.

The stop 25 may take any convenient form such as the construction shown in Figure 3. The stop comprises a tubular body 66 secured to the frame by an arm 67 and carrying a stem member 68. The stem member 68 is urged rightwardly as viewed by a spring 69 which is confined within the body between shoulder 70 of the body and shoulder 71 of the stem. The stem is capable of taking two longitudinal positions under the influence of the spring, a stop position in which a pin 72 extending through the stem abuts the end of the tubular body, and an inoperative position in which the stem is rotated 90° so that the pin 72 will seat in a notch 73 in the end of the tube. Thus in the position shown the stem acts to position the faller bar within the jaws, but before the current is turned on, the stop is retracted to allow the faller bar to expand thermally.

The jig and the needles are positioned laterally with respect to the faller bar by spring means 75 comprising bolts 76 which extend through the portion 22 of the frame 18 and springs 77 which force the bolts to abut the back of the jig and urge it outwardly of the frame and adjacent the faller bar when it is held in the jaws. The springs 77 are confined between the heads 73 of the bolts 76 and the bottoms of recesses 79; the bolts are held to the frame and their movement is limited by nuts 78 secured thereto, see Figure 3.

In use the needles are placed within the grooves 42 of the block 41 and are clamped in place by the strip 45, member 46 and the clamps 49. The jig is then inserted into the fixture and manually held in place while the bar is clamped in place in the jaws 24. When the jig is released the spring means 75 of the fixture will force it and the needles outwardly adjacent the bar, the needles and the bar being forced to take their proper positions relative to each other in this manner. The stop is withdrawn from its position in alignment with the bar so that it will not be in a position to interfere with the free movement of the bar when it subsequently expands in length when it is heated by the passage of the applied electric current. In this position the butt ends of the needles lie within the groove 16 in the bar as shown in Figure 3. Ordinary acid soldering flux is applied and solder in strip form is then laid within the groove to lie over the butt ends of the needles. A circuit is then established by closing a switch which sends a timed sequence of surges of alternating current through the bar. The voltage, amperage, and time of flow may vary according to the resistance of the bar, and the temperature desired. Too high a current will lead to overheating with the consequent softening of the hardened bar and needles which of course is objectionable. Too low a current will not adequately melt the solder. With a bar having a cross section as shown in Figure 2, and having dimensions such that the cross-sectional area is about 0.10 square inch a current of about 800 amperes under a pressure of 220 volts produces good results. Under these conditions the bar heats rapidly and uniformly to a temperature high enough to rapidly melt the strip solder. Both low melting and high melting solders have been successfully used. However I prefer to use high melting solder, that is, solder having a melting point of about 700° F. As this solder melts it may be puddled with a small flat wooden paddle to ensure that the solder flows into all the crevices, filling the spaces between the needles and between the needles and the groove. A strip of stiff wire gauze is laid onto the solder after puddling is complete and while the solder is still molten. A second strip of solder is then placed over the gauze and for the second time a shot of current at 220 volts is put through the bar. The second strip of solder upon melting will substantially completely fill the groove 16 and bond the gauze and the needles securely to the bar. Finally in order to hold the temperature without overheating and to insure thorough melting a third shot of current, this time at 110 volts, is put through the bar. The time of current flow for each shot is approximately 45 seconds so that altogether the current flows for slightly more than two minutes.

It is desirable to provide for the free thermal expansion of the bar as its temperature is raised to the 700° or so that is required to melt a high melting solder. If expansion of the bar is restricted the bar will tend to bend under the resulting stresses and the accurate assembly required of the faller bar construction will be prevented. It is for this reason that the jaws 24 preferably have a grip on the bar which permits sliding engagement therein.

With the apparatus thus described it is possible to substantially increase the production of the soldered bars, producing a better and more uniform product with substantial savings in manufacturing cost. The apparatus has proved to be adaptable to use with faller bars of other designs. Thus consistent and good production has been obtained with a faller bar in which the needles are soldered within a longitudinal grooved recess rather than within an open groove like the example described above. Low melting, i. e., 350° F. solder was used and the electrical current modified accordingly. The results were uniformly good.

Other forms and modifications of my invention will occur to those skilled in the art without departing from the spirit and scope of my invention and I do not care to be limited in any manner other than by the following claims.

I claim:

1. Apparatus for soldering needles within a recess of a faller bar by passing electric current through said bar to heat the bar and melt solder applied thereto, comprising a frame, jaws secured to said frame for holding said bar, a jig for holding a plurality of needles in accurately parallel spaced relationship, releasable clamp means for imposing clamping pressure on said needles and locking said needles in position on said jig, means carried by said frame coacting with said jig to position same and said needles accurately with respect to said bar, and electrical connections secured to said jaws to pass an electric current through said faller bar to heat said bar.

2. Apparatus for soldering needles within a recess in a faller bar by passing electric current through said bar to heat the bar and melt solder applied thereto, comprising a U-shaped frame, a pair of jaws secured to the frame adapted to receive and hold the ends of said faller bar, a stop movable to an operative position to determine the longitudinal position of said bar when it is initially gripped by said jaws and movable to inoperative position thereafter and a jig for holding a plurality of needles in accurately parallel spaced relationship adapted to be assembled with said frame to hold said needles adjacent said bar and electrical connections secured to said jaws to pass an electric current through said faller bar to heat said bar.

3. Apparatus for soldering needles to a faller bar by passing electric current through said bar to heat the bar and melt solder applied thereto, comprising a frame, jaws secured to the frame to receive and hold the ends of said faller bar accurately with respect to said frame, a stop movable to an operative position to determine the longitudinal position of said bar when it is initially gripped by said jaws and movable to inoperative position thereafter and a jig for holding a plurality of needles in accurately parallel spaced relationship comprising a bed portion having a plurality of grooves to receive said needles, a clamping member adapted to hold said needles within said grooves, and means to impose clamping pressure on said member, means mounted on said frame adapted to cooperate with said jig to position said jig accurately with respect to said faller bar, and electrical connections to pass an electric current through said faller bar to heat said bar.

4. Apparatus according to claim 3 in which said jaws grip the ends of said faller bar whereby to permit sliding engagement therebetween when said bar thermally expands and contracts.

5. Apparatus for soldering needles within a recess in a faller bar by passing electric current through said bar to heat the bar and melt solder applied thereto, comprising a U-shaped frame having a pair of arms extending from a back portion, jaws secured to the frame, adapted to receive and hold the faller bar, a stop movable to an operative position to determine the longitudinal position of said bar when it is initially gripped by said jaws and movable to inoperative position thereafter and a jig for holding a plurality of needles in accurately parallel spaced relationship comprising a bed portion having dielectric properties and having a plurality of grooves to receive said needles, a clamping member adapted to hold said needles within said grooves, a resilient, heat resistant strip interposed as a cushion between said needles and said clamping member and means to impose clamping pressure on said member, a relatively hard dielectric block adjacent said bed portion to position the needles longitudinally within said grooves and against which the pointed ends of said needles are adapted to abut, means to position said jig accurately with respect to said frame with the butt ends of said needles extending from said bed portion into said faller bar recess, and electrical connections adapted to pass an electric current through said faller bar to heat said bar, said jaws gripping said faller bar to permit sliding engagement therebetween when said bar thermally expands and contracts.

6. The method of soldering needles to a faller bar which comprises placing the needles in parallel spaced relationship with their pointed tips aligned, and holding the bar and needles in accurately positioned relationship, supplying solder thereto and passing an electric current through the bar producing a substantially uniform heat therein to melt the solder while allowing the bar to expand longitudinally under the influence of the increased temperature, and holding the needles relatively fixed.

7. The method of claim 6 wherein said electric current is passed through the bar in successive surges of relatively short duration.

8. The method of claim 7 wherein said current comprises two successive surges of current at about 220 volts for periods of about forty-five seconds and a third surge at about 110 volts for about forty-five seconds.

9. Apparatus for soldering needles to a faller bar by passing electric current through said bar to heat the bar and to melt solder applied thereto, comprising a frame, jaws secured to the frame to receive and hold the faller bar accurately with respect to said frame and a jig for holding a plurality of needles in accurately spaced relationship comprising a bed portion having a plurality of grooves to receive said needles, a clamping member adapted to hold said needles within said grooves and means to impose clamping pressure on said member, and means mounted on said frame adapted to cooperate with said jig to position the jig accurately with respect to said faller bar, and electrical connections to pass an electric current through said faller bar to heat said bar.

10. Apparatus for soldering needles to a faller bar by passing electric current through said bar to heat the bar and to melt solder applied thereto, comprising a frame, jaws secured to the frame to receive and hold the faller bar accurately with respect to said frame, a jig carried by said frame for holding a plurality of needles in accurately spaced relationship comprising a bed portion in juxtaposition with said bar having a plurality of grooves to receive said needles and extending in a direction transversely of said bar, a clamping member adapted to hold said needles within said grooves and means to impose clamping pressure on said member, and electric connections, to pass an electric current through said faller bar to heat said bar, said jaws on said frame gripping said faller bar so as to permit the bar to move relative to the jaws when the bar thermally expands and contracts.

11. The method of soldering needles to a flat surface on the body of a faller bar which comprises placing the needles in parallel spaced relationship with their pointed tips aligned and with the roots of the needles remote from the tips in contact with said surface on the faller bar, holding the bar and needles in accurately positioned relationship, supplying solder to the bar and to the roots of the needles, passing an electric current through the bar producing a substantially uniform heat in the bar to melt the solder, continuing to hold the bar in substantially said relationship while permitting the bar to expand longitudinally under the influence of the increased temperature, holding the tip portions of the needles relatively fixed in said jig, shutting off the current and allowing the bar to cool and contract while being so held and permitting the solder to cool and solidify thereby securing the roots of the needles to said bar.

ALFRED J. CRAIG.

REFERENCES CITED

The following references are of record in the file of this patent:

UNITED STATES PATENTS

| Number | Name | Date |
|---|---|---|
| 403,707 | Thomson | May 21, 1889 |
| 1,376,106 | MacDonald et al. | Apr. 26, 1921 |
| 1,673,408 | Holdsworth | June 12, 1928 |
| 1,695,791 | Yunck | Dec. 18, 1928 |
| 1,760,155 | MacDonald et al. | May 27, 1930 |
| 1,850,473 | Owston | Mar. 22, 1932 |
| 1,872,494 | Petersen | Aug. 16, 1932 |
| 1,956,233 | Braun | Apr. 24, 1934 |
| 2,231,695 | Vedder | Feb. 11, 1941 |
| 2,400,472 | Strickland | May 14, 1946 |
| 2,410,665 | Lea et al. | Nov. 5, 1946 |